Patented Apr. 2, 1935

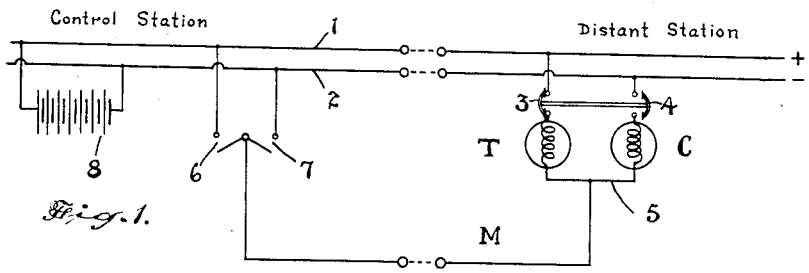
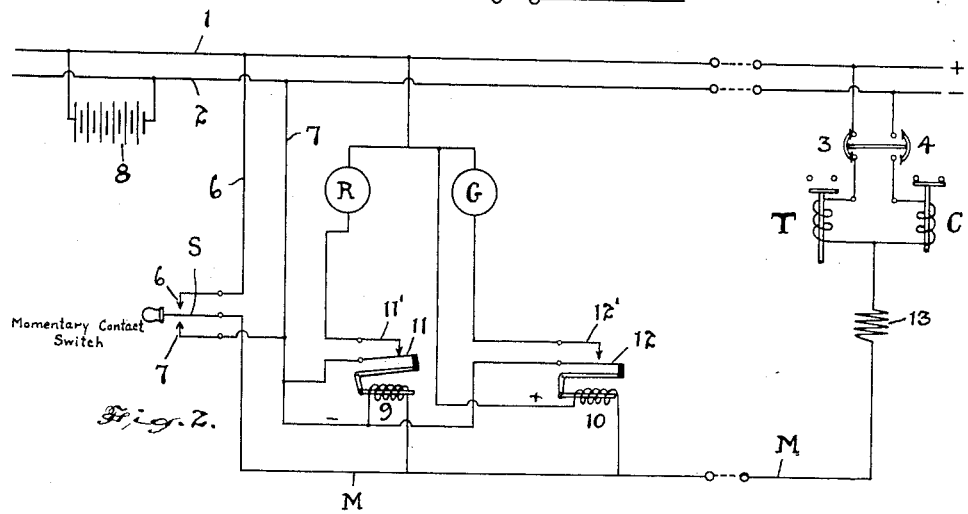
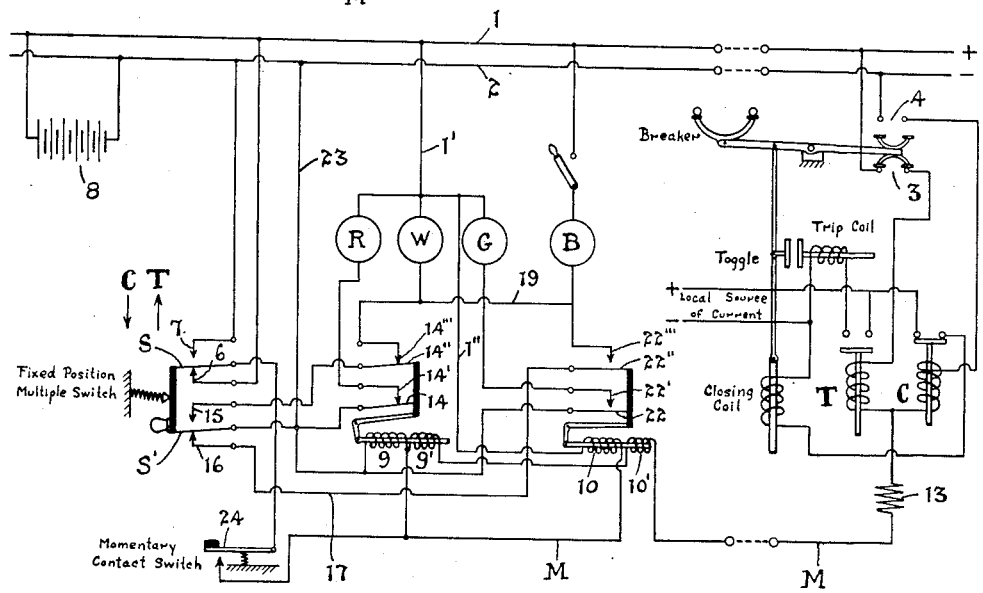

1,996,268

UNITED STATES PATENT OFFICE 1,996,268

SUPERVISORY ELECTRIC CONTROL SYSTEM

Frank F. Ambuhl and William F. Sutherland, Toronto, Ontario, Canada, assignors to Toronto Electric Commissioners, Toronto, Ontario, Canada Application July 17, 1930, Serial No. 468,481

7 Claims. (Cl. 177—311)

The principal objects of the invention are to minimize the number of wires to be carried from station to station where controlled apparatus is installed, to effect a material reduction in the cost of installation and maintenance, and to devise a system which will be quite flexible and may be operated with ease.

The principal feature of the invention consists in the novel arrangement of control devices, switches and signalling devices whereby the control devices are manipulated through a single wire connection to the switch members, and signals indicating the condition of the control devices are incorporated into the arrangement.

In the drawing, Figure 1 is a very simple diagrammatic illustration of the fundamental principles involved in the invention.

Figure 2 is a diagram similar to Figure 1 including means for indicating the functioning of the device.

Figure 3 is a diagram similar to Figure 2 showing a more complete arrangement of indicating apparatus.

It is frequently desirable, particularly in installation of electric apparatus in connection with the distribution of power, that control devices be installed at numerous distant points and that such shall be operable from a central station. Such control apparatus is usually in the form of electric circuit breakers which may have open and closed positions.

The present invention while being described as applicable to such devices, may, however, be applied to other devices having characteristics suitable for the number and kind of operations which can be performed with circuit breakers.

In carrying this invention into effect, the first principle, as illustrated in Figure 1, consists in the arrangement of a pair of common bus wire 1 and 2 which extend throughout the desired system and supply the source of power for operating the device for controlling the controllable members such as circuit breakers.

Connected with the wires 1 and 2 respectively are a pair of pallet switches 3 and 4 which are adapted to open and close in accordance with the operation of the circuit breaker being controlled.

Coils T and C are connected respectively with the pallet switches 3 and 4 and such coils are adapted to operate the circuit breaker and are connected together by a wire 5 which is connected to the monowire M. This wire extends along with the bus wires 1 and 2 to the control station where a suitable switch, here illustrated as a double-throw switch with terminals 6 and 7 is arranged. The bus wires 1 and 2 are energized in any suitable manner, here shown as by a battery 8.

In the operation of this simple system the manipulation of the double-throw switch connects either bus 1 or 2 through the monowire M to each of the coils T or C and in accordance with the polarity chosen the circuit breaker will be caused to open or close through the flow of the current through the coils.

The arrangement of the pallet switches 3 and 4 obviates the necessity of a series connection between the coils T and C and the two busses. The switch 3 is adapted to be closed when the circuit breaker is closed and the switch 4 when the breaker is open.

It will thus be seen that two operations are performed over the monowire M.

When it is desired to obtain an indication in respect to the switch position, indication devices are incorporated according to the present invention in the monowire circuit, at the control end as illustrated in Figure 2 and now to be described.

The contacts 6 and 7 are connected to the busses 1 and 2 respectively while the switch arm S is connected to the monowire M.

Connected across the wires M and 2 is a relay 9 and connected across the wires M and 1 is a relay 10. The relay 9 moves a switch blade 11 into engagement with a contact 11' to close a circuit R from the negative bus 2 through wire 7 to the positive bus 1 and the relay 10 moves a switch blade 12 into engagement with a contact 12' to close a circuit G from the positive bus 1 to negative bus 2 through wire 7.

A circuit normally exists from positive relay 10, wire M relay 9 to negative. This circuit however has no effect on lamp indication relays 9 and 10 since either 9 or 10 is in effect shorted out by a circuit through wire M, coils T or C and contacts 3 or 4 respectively. This latter circuit places approximately full line voltage on one or other of the lamp relays 9 or 10, depending on the position of the breaker with which contacts 3 and 4 are associated. The other relay of the two has impressed across its coil only a voltage corresponding to the line drop through wire M and that in coils T or C.

It will be seen that when the control switch S is momentarily closed to the contact 6 the current from bus 1 flows through M to the relay C and closes the circuit breaker operated thereby and upon the closing of the circuit breaker the pallet switch 4 is opened and the switch 3 is closed. A circuit is thus prepared from the positive bus 1 through switch 3, relay T and coil 13 in wire M to the element S so that the way is prepared for the subsequent opening of the circuit breaker when switch S is manually closed against contact 7.

It will also be noted that a circuit is established from the positive bus 1 through switch 3, coil T, wire M and relay 9 to the negative bus 2. The relay 9 is thus energized and it effects the closing of the switch blade 11 against contact 11' and the circuit R is thus closed which includes a red light and this gives indication that the breaker is closed. While the current for the energizing of the relay 9 flows through the relay coil T, such current is not sufficient to operate the relay T, that is to say, the coils 9 and T are of such differing values of resistance and turns that the relay 9 will operate but the coil T will not.

The switch S is assumed to be of the momentary contact type and is normally in mid-position where it is out of contact with either 6 or 7.

Relays 9 and 10 have windings of high resistance and many turns so that a relatively small current will suffice to operate their armatures, while relays T and C have windings of low resistance and few turns so that their armatures are inoperative on small currents, but require currents of relatively large magnitude.

It is an essential feature of the present invention that the ratio of the resistance and turns of relays 9 and 10 to that of T and C be as high as possible. This high ratio of resistance and turns of the relays enables the use of the system over considerably extended distances. Further, the use of relays in the specific relation set forth in the present invention as an intermediate control element effecting the ultimate control of the indicating lamps and signals is important. The direct operation of indicating lamps is highly objectionable since lamps have a low resistance and consume considerable current so that the effective length of the system is materially reduced, whereas the present system will ensure the operation of the lamps at full efficiency over a considerably extended distance by employing relays as the initially actuated means, such relays having an extremely high resistance comparable to the lamps which they control.

When the breaker is opened or opens by itself the current flows from the negative bus 2 through the switch 4 which will then be closed and relay C, wire M and relay 10 back to the positive bus 1. The energizing of the relay 10 moves the switch blade 12 into contact with 12' to close the green lamp circuit G from positive bus 1 through wire 7 to negative bus 2.

The coil of relay 9 is selectively constructed of different resistances and turns from that of the relay T and preferably of considerably higher resistance so that the current flowing through the coil T will operate the relay 9 but it is not sufficient to operate the relay T. The same condition exists in respect to the relay C and the relay 10. The resistance 13 shown in the wire M is designed to adjust line resistance to the proper value for correct relay operation and enables the use of standard relays over varying distances which obviously varies with the distance between stations.

It may be found desirable to introduce into the system either an audible or a visible alarm or both, to indicate any independent change in position of the monowire control through protective relay action. The diagram illustrated in Figure 3 shows such an arrangement.

The switch S and S' of Figure 3 is of the multiple locking type remaining in the position of last use. The contacts 11 and 11' illustrated in Figure 2 are replaced by multiple contacts 14, 14', 14'', 14''' which are adapted to be closed simultaneously upon operation of relay 9 so that a circuit is closed from negative bus 2 through contacts 14—14', lamp circuit R to the positive bus 1 and simultaneously a circuit is closed through contacts 14''—14''' which connects the positive bus through the lamp circuit W to the switch member S' when the said switch engages the contact 15.

The lamp circuit W will also be energized when switch member S' engages contact 16 by a circuit established from bus 2 through wire 23, switch blade S', contact 16, wire 17 and contacts 22''—22''' in co-operation with relay 10 which connects the lamp circuit W through the wire 19 to the bus wire 1.

It is desirable that an audible signal be given at the same time the lamp circuit W is energized and a bell B is provided, one terminal of which may be connected with the lead 19 and the other to the bus wire 1 so that when the contacts 22''—22''' are closed as stated, the bell will ring. It will thus be seen that the white light circuit W will be energized at the same time as will the bell circuit through the automatic operation of the circuit breaker so that a visible and audible warning will be given.

In the circuit from switch S to wire M a master key 24 is provided to eliminate inadvertent or malicious operation. This master key retains an open circuit unless it is closed by the operator when he desires to send a closing energy over the monowire M. This master key also clears direct positive or negative potential from the monowire and permits correct functioning of the lamp relays 9 and 10.

When the circuit breaker is in the normally open position green lamps G will be lit since a circuit will then be closed from positive bus 1 through contacts 22—22', on relay 10 through wire 23 to negative bus 2. Relay 10 will be at this time energized from bus 1 through wire M coil C and pallet switch 4 to negative bus 2. Both ends of relay 9 winding will be connected to negative bus 2, one directly, the other through coil C and pallet switch 4, consequently its coil will have impressed across it, only a voltage due to line drop and the drop in coil C proportional to the current through 10. Relay 9 will therefore not operate at this itme.

Switch contacts S and S' will normally, with open breaker engage contacts 7 and 15 respectively. The circuit through 7 is open at master switch 24; that through 15 is open at 14'''—14'', relay 9 being de-energized.

To close the circuit breaker the control switch is moved to the closed position, S making contact on 6 and S' making contact on 16. When master key 24 is operated a circuit is made from positive bus 1 through contact 6, blade S and 24 through wire M, coil C and pallet switch 4 to negative bus. The breaker closes and in closing opens 4 and closes 3.

Relay 10 is de-energized through the shorting of its coil by contact 3 closing. Relay 9 is energized from positive bus 1 through 3, T, M, to negative bus 2.

In the event of the circuit breaker opening when the apparatus is in the position described through overload relay action or some other cause, the relay 9 will become de-energized and the relay 10 will be energized, thus causing the red light to go out and the green light to light up. The white light also lights under such conditions and the alarm bell rings. An audible warning is thus given to the attendant and a glance at his keyboard will indicate to him the particular circuit breaker that has caused the trouble by reason of the white light signal. He can then eliminate the ringing of the bell and put out the white light by moving the switch S and S', (Figure 3) so that it will agree with the circuit breaker position.

It will be noted by reference to Figure 3 that should the monowire M be open-circuited by breakage or by design, full voltage will be impressed across the relay coils 9 and 10 causing both to operate and consequently causing both lamps R and G to light up. Alarm lamp W will also be caused to light up irrespective of the position of the key by virtue of the presence of contacts 15 and 16. A visible indication is thus obtained of trouble on the monowire circuit or of the fact that the particular unit is inoperative.

Heretofore, in previous supervisory control systems the alarm lamp W and only one of either R or G would be illuminated at any given time irrespective of the condition of the apparatus.

It will thus be seen that superimposed on the ordinary green and red light indication it is possible, over the monowire circuit described, to provide an additional supervisory indication to show when the control switch does not agree in position with the controlled equipment at the distant sub-station and it also gives an audible indication of the independent operation of the controlled equipment.

It might be found desirable to add an audible signal to co-operate with the operation of the relay 9 similar to that shown as applied to the relay 10, but the application of such would come within the scope of the present invention so that an audible signal would be given when the control switch differs either way from the position of the equipment being controlled.

In the arrangement shown in Figure 3 the red and green lamps momentarily indicate the position of the control switch S while the master key 24 is depressed. This is caused through the short circuiting of one lamp relay coil and the energizing of the other with a full bus potential by a circuit completed through the master key 24 on either contact 6 or 7 of the switch S. This may not be desirable.

In order to have the lamps R and G always indicate the true position of the circuit breaker, even during the short period that the master key 24 is closed, two additional coils 9' and 10' are here shown as arranged in position respectively with the relays 9 and 10 in Figure 3. These coils are connected in the common or monowire line M to the distant station and are preferably of fewer turns and heavier wire than the coils 9 or 10 respectively and capable of carrying sufficient closing current for the relays T and C when the master key 24 is closed for switch operation. At other times they carry only a small fraction of the closing current, that due to the lamp indication relays. The effect is as follows:

The number of turns and the resistance of the coils in the system may be accurately proportioned so that relay coil T or C will operate when connected in line with only coils 9' and 10' or by itself, but will not operate when connected in line with 9 or 10 and 9' and 10' or with either 9 or 10.

Assume the circuit breaker to be in the open position with the light G lit and relay 10 energized by current flowing from positive bus 1 through leads 1'—1'', coil 10, wire M, coils 9'—10', wire M, coil C, switch 4 to negative bus 2. Current is thus flowing through coils 10 and 10' in a common direction so that they produce collectively a combined magneto-electromotive force on the armature tending to hold the relay 10 in its closed position. Now in order to close the circuit breaker the switch blades S and S' are moved to engage the contacts 6 and 16 respectively and then the master key 24 is closed for a sufficient time only to effect the operation of the relay C. Simultaneously, the coil of the relay 10 is shorted through wire M, key 24, switch S, contact 6 to bus wire 1 and so is de-energized, while that of relay 9 is energized by full line potential from bus wire 1 through contact 6, switch S, key 24 and wire M through coil C, switch 4 to negative bus. Ordinarily this would cause a change in lamp indication, but the closing current for relay C passing from bus 1 through contact 6, switch S, key 24 and wire M passes also through the relay coil 9' in a direction opposite to the direction of flow of the current in the coil 9 and in so doing sets up a counter magneto-motive force to that in coil 9 so that the armature of relay 9 and the contacts associated therewith, do not change position.

The current passing through the last-mentioned conductors passes from the coil 9' through the coil 10' to the remote or field side of wire M then through relay coil C and switch 4 to bus wire 2 completing the circuit, and although coil 10 has been de-energized, the simultaneous energizing of coil 10' with a current having a directional flow the same as that through 10 before it was de-energized by shorting, causes the relay 10 to remain closed. The indication is therefore not affected through the contacts 6 or 7 and 24. The above is a momentary condition during the short period in which the key 24 is depressed and when the circuit breaker operates in consequence of the closing of relay C (and assuming the key 24 to be now open), the pallet switches 3 and 4 change position and the closing current for C is cut off.

A circuit is thus established from bus 1 through switch 3, coil T, wire M, coils 10'—9'—9, lead 23 to negative bus 2, coil 10 being at this time connected at both ends to positive bus 1 so that it is shorted or de-energized.

It will thus be seen that the flow of current through coils 10'—9' is now in the reverse direction to what it was as previously defined above and since coil 10 is now de-energized, the magneto-motive force of 10' imparts an opening influence to the relay, and since the current flow through 9' and 9 is now in a common direction, their combined influence or magneto-motive force moves the armature and its contacts to closed position so that the lamps will now indicate the new (closed) position of the breaker.

Thus not till after the actual change of position of the circuit breaker is the change of indication brought about in the indicating lamps through the co-operation of coils 9' and 10' with the respective relay coils 9 and 10 and their armatures and the switches 3 and 4 so that a false indication is at no time shown by said lamps.

Further, in the event of the controlling switch having been moved to change the position of the remote breaker and should the breaker refuse for any reason to operate, the lamps will not change their indication and will continue to show the true position of the breaker irrespective of the position of the control key.

Precisely the same action takes place in tripping a breaker formerly closed. The lamp relays do not change positions until the circuit breaker actually opens and upon the opening of the breaker switch 4 closes so that coils 9, 9' and 10' will be shorted out by a connection extending from negative bus 1 through 23, coils 9—9'—10', field side of wire M, coil C, switch 4 back to negative bus 2, while coil 10 is energized from positive bus 1 through 1'—1'', coil 10, wire M, coils 9'—10', field side of wire M, coil C, switch 4 to negative, so that lamp G will be energized by operation of relay 10.

It is desirable that the coils 9' and 10' should have approximately the same number of ampere-turns as coils 9 and 10. Coils 9 and 10 are of the high resistance many-turn type while coils 9' and 10' are of few turns and are wound with heavier wire since they are in series with the closing of the trip coils C or T and it is important to note that the effect of the coils with relation to one another and the armature is determined to a large extent on the direction of flow of the current through the respective coils.

While coils T and C have been shown as pertaining to two separate relays, it is obvious that equivalent means such as a polarized relay having two windings of low resistance can be used.

It will be understood that the present invention will not be limited to any particular form of mechanical apparatus, but suitable standard switches may be found that will serve the purpose and these may be assembled in any desirable manner on a suitable switchboard. These control units form a very simple assembly and as many of these as required may be assembled into a complete control board, each one being virtually independent and capable of replacement without affecting the others.

It has been particularly defined in this specification that the controlled device is in the form of a circuit breaker, but the system is not limited to such but may be applied to any device, the control of which may have characteristics suitable for the number and kind of operations which can be performed.

What we claim as our invention is:—

1. In a supervisory electric control system, the combination with positive and negative bus wires, of a pair of relays having respective coils, means controlled by said relays including switching means selectively connecting one end of each of said coils to the respective bus wires, a single control wire connected to the other end of each of the relay coils and connected through either one or the other of said relay coils with a respective one of said bus wires in accordance with the operation of said switching means, a switch connected with said single wire and having selectively engageable contacts connected respectively with said bus wires, a pair of relays having windings of high resistance and many turns compared to that of the coils of the former relays, said high resistance windings having one end connected respectively with the respective positive and negative bus wires and each having their other end connected to said single control wire, and indicating means controlled by said high resistance relays in accordance with the operation of said first-mentioned switching means, the resistance of said second-mentioned relays being sufficiently greater than that of the first-mentioned relays that current passing therethrough is insufficient to operate the first-mentioned relays.

2. In a supervisory electric control system, the combination with positive and negative bus wires, of a pair of relays having respective coils, means controlled by said relays, switching means operatively associated with said relay controlled means and alternately connecting one end of each of said coils with the respective bus wires in accordance with the operation of said relay controlled means, a single control wire connected to the other end of each of the relay coils, and connected through either one or the other of said relay coils with a respective one of said bus wires in accordance with the operation of said switching means, a switch connected with said single wire and having selectively engageable contacts connected respectively with said bus wires, a pair of relays having windings of high resistance and many turns compared to that of the coils of the former relays, said high resistance windings having one end connected respectively with the respective positive and negative bus wires and each having their other end connected to said single control wire, and indicating lamp circuits having indicating lamps therein associated respectively with and controlled by said high resistance relays in accordance with the operation of said first-mentioned switching means, the resistance of said second-mentioned relays being sufficiently greater than that of the first-mentioned relays that current passing therethrough is insufficient to operate the first-mentioned relays.

3. In a supervisory electric control system, the combination with positive and negative bus wires, of a pair of relays having respective windings, means controlled by said relays, a single control wire connected to one end of each of said relay windings, a switch member connected with said single wire and having contacts selectively engageable therewith and respectively connected to said positive and negative bus wires, relays having windings of high resistance and many turns compared to that of the aforesaid relays and being each connected at one end to the single wire and having their other ends connected respectively to the respective power wires, lamp circuits having indicating lamps therein controlled by said high resistance relays, said controlled means including switch means interposed between said bus wires and the other end of said first mentioned relay windings to direct current selectively from either of said bus wires through one or other of said first mentioned relay windings to said single control wire in accordance with the operation of said first-mentioned pair of relays to selectively energize the high resistance relays, and means selectively controlled by said last-mentioned switch means for temporarily controlling the action of said high resistance relays.

4. In a supervisory electric control system, the combination with positive and negative bus wires, of a pair of relays having respective windings, means controlled by said relays, a single control wire connected to one end of each of said relay windings, a manually operable switch member connected with said single wire and having contacts selectively engageable therewith and respectively connected to said positive and negative bus wires, relays having windings of high resistance and many turns compared to that of the aforesaid relays each connected at one end to the single wire and having their other ends connected respectively to the respective bus wires, lamp circuits having indicating lamps therein controlled by said high resistance relays, and switch means interposed between said bus wires and the other end of said first-mentioned relay windings and operatively associated with the means controlled by said low resistance relays to direct current selectively from said bus wires through one or the other of said low resistance relay windings to said control wire in accordance with the operation of said first-mentioned relay controlled means, relay control coils influentially related to said second-mentioned relays and having a variable connection with said positive and negative bus wires through said last-mentioned switch means to temporarily prevent the operation of the corresponding high resistance relays until the position of said manually operable switch member agrees with the position of the low resistance relays and the means controlled thereby, and means separate from said manually controlled switch for momentarily closing the control wire circuit.

5. In a supervisory electric control system, the combination with positive and negative bus wires, of a pair of relays having respective windings, means controlled by said relays, a single control wire connected to one end of said relay windings, a manually operable fixed position switch member connected with said single wire and having contacts selectively engageable therewith and respectively connected to said positive and negative bus wires, relays having windings of high resistance and many turns compared to that of the aforesaid relays each connected at one end to the single wire and having their other ends connected respectively to the respective power wires, a lamp circuit controlled by each of said relays, said lamp circuits having lamps therein for indicating the respective operations of said low resistance relays, said controlled means including switch means for directing current selectively from either of said bus wires through one or other of the windings of the first mentioned relays to said single control wire in accordance with the operation of the means controlled by said first mentioned pair of relays, a third light circuit having contacts co-operating with both of said relays, an indicating lamp in said third circuit, switch means co-operating with said manually operable switch to control the energizing of said third light circuit, and a momentary contact switch in said single control wire.

6. In a supervisory electric control system, the combination with positive and negative bus wires, of a pair of relays having respective windings, means controlled by said relays, a single control wire connected to one end of said relay windings, a manually operable fixed position switch member connected with said single wire and having contacts selectively engageable therewith and respectively connected to said positive and negative bus wires, a pair of multiple contact relays each having operating coils of high resistance and many turns compared to that of the first mentioned relays, said coils being connected at one end to the respective bus wires and each having their other end connected with said single control wire, one contact of each relay being connected by a common lamp circuit with one of the bus wires, the respective contacts engageable therewith each being connected to a pair of spaced contacts, a second contact of one of said relays being connected by a separate lamp circuit to the aforesaid bus wire, a manually operable switch member connected with the co-operating contact of said latter lamp circuit contact and selectively engageable with said spaced contacts and moveable in unison with said manually operable switch member, the other relay having a contact connected by a lamp circuit to the aforesaid bus wire the co-operating contact thereof being connected with the other bus wire, said relays each having a control coil connected with said single control wire at one end and with a respective one of said bus wires at the other end for temporarily controlling the action of the high resistance relays, indicating lamps arranged in said respective lamp circuits, and switch means independent of said manually operable switch member for momentarily completing a circuit through said control wire.

7. A supervisory electric control system as claimed in claim 6 in which said control coils are connected in series and form part of said single control wire.

FRANK F. AMBUHL.
WILLIAM F. SUTHERLAND.